United States Patent [19]
Komiya et al.

[11] Patent Number: 5,988,210
[45] Date of Patent: Nov. 23, 1999

[54] FLOW CONTROL VALVE UTILIZING SONIC NOZZLE

[75] Inventors: Isamu Komiya, Akiruno; Masahiro Nambu, Tama, both of Japan

[73] Assignee: Aera Japan Ltd, Tokyo, Japan

[21] Appl. No.: 08/980,246

[22] Filed: Nov. 28, 1997

[30] Foreign Application Priority Data

Mar. 27, 1997 [JP] Japan .................................... 9-091330

[51] Int. Cl.[6] .................................................. F16K 31/12
[52] U.S. Cl. .................. 137/487.5; 137/486; 251/129.06
[58] Field of Search ............................... 137/487.5, 486; 251/129.06

[56] References Cited

U.S. PATENT DOCUMENTS

| | | |
|---|---|---|
| 4,146,051 | 3/1979 | Sparks .................................. 137/487.5 |
| 4,399,836 | 8/1983 | De Versterre et al. ............... 137/487.5 |
| 4,641,683 | 2/1987 | Murner ................................. 137/487.5 |
| 4,836,233 | 6/1989 | Milgate, III ............................. 137/486 |
| 5,029,610 | 7/1991 | Hiratsuka et al. .................. 251/129.06 |
| 5,033,496 | 7/1991 | Reid .................................... 251/129.06 |
| 5,460,202 | 10/1995 | Hanley et al. ...................... 251/129.06 |
| 5,669,408 | 9/1997 | Nishino et al. ....................... 137/487.5 |

*Primary Examiner*—Denise L. Ferensic
*Assistant Examiner*—Joanne Y. Kim
*Attorney, Agent, or Firm*—Lightbody & Lucas

[57] ABSTRACT

A flow control valve for a semiconductor manufacturing process, which valve utilizes a pressure sensor between the flow control valve and a subsequent sonic nozzle to detect the gas pressure which is fed back to the valve to control the flow through the valve.

15 Claims, 2 Drawing Sheets

FLOW CONTROL VALVE UTILIZING SONIC NOZZLE

INDUSTRIAL FIELD OF UTILIZATION

The present invention pertains to the technical field of a flow control valve of the gas which is used in a semiconductor manufacturing process.

PRIOR ART

Many of conventional flow control valves use a thermal sensor. Such a flow control valve, for example as shown in Japanese Unexamined Patent Publication No. 61-157912, uses a change in the temperature of a sensor tube to detect a flow and transforms the change in the temperature into an electric signal with a bridge circuit to feed it back, thereby controlling the flow.

PROBLEMS TO BE SOLVED BY THE INVENTION

However, such a flow control valve detects the change in the temperature and hence the response of a flow control is bad as a matter of course. Therefore, it has a problem that it can not respond to an abrupt change in the pressure or the temperature of supplied gas and thus allows an excessive amount of gas to flow in or out in some cases. Moreover, it has another problem that it has only a flow control function and hence a pressure monitor must be additionally provided for safety countermeasures.

MEANS FOR SOLVING THE PROBLEM

The present invention solves the above described problems by a flow control valve comprising a base disposed in a fluid passage and a valve member fixed on the base, wherein a sonic nozzle is disposed at the exit side of the valve member and wherein a gas pressure in the upstream side of the sonic nozzle is detected by a pressure sensor and fed back to the valve member.

As for the sonic nozzle used in the present invention, many patents have been filed and its fundamental constitution, operation and effect have been know to everybody and will not be described in detail in this specification. The condition that the velocity of gas passing through a nozzle equals to a sound velocity is shown by the following equation:

$$Pd/Pu < 0.05,$$

where Pd is a pressure in the downstream side (absolute pressure), Pu is a pressure in the upstream side (absolute pressure).

The flow passing through the nozzle on this condition is shown by the following equation:

$$Qm = Cd \cdot S \cdot a \cdot \rho,$$

where Qm is mass flow (g/s), Cd is a flow out coefficient, S is cross-sectional area of the nozzle ($m^2$), a is a sound velocity (m/s), $\rho$ is the density of gas ($g/m^3$).

If Cd, S and a are constant, Qm is proportional to $\rho$ and, if the temperature is constant, $\rho$ is proportional to Pu and hence the flow Qm results in being proportional to the pressure in the upstream side Pu: that is to say, the flow is determined by the pressure in the upstream side. Therefore, if a sonic nozzle is used for controlling the flow of gas, the flow of gas can be controlled by controlling the pressure in the upstream side which is the pressure of gas at this side of the sonic nozzle.

Figure 4:
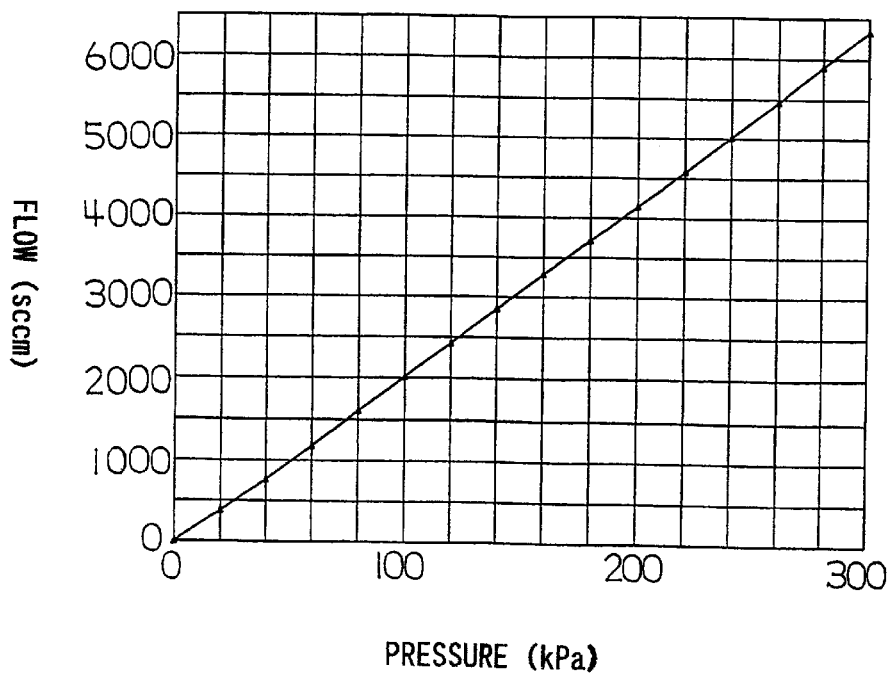
FIG. 4 is a drawing showing the relationship between the flow and the pressure of a sonic nozzle.

FIG. 4 shows an example of the pressure flow characteristics of the sonic nozzle and it is clear from this drawing that the pressure of gas is proportional to the flow.

PREFERRED EMBODIMENT OF THE INVENTION

Figure 1:
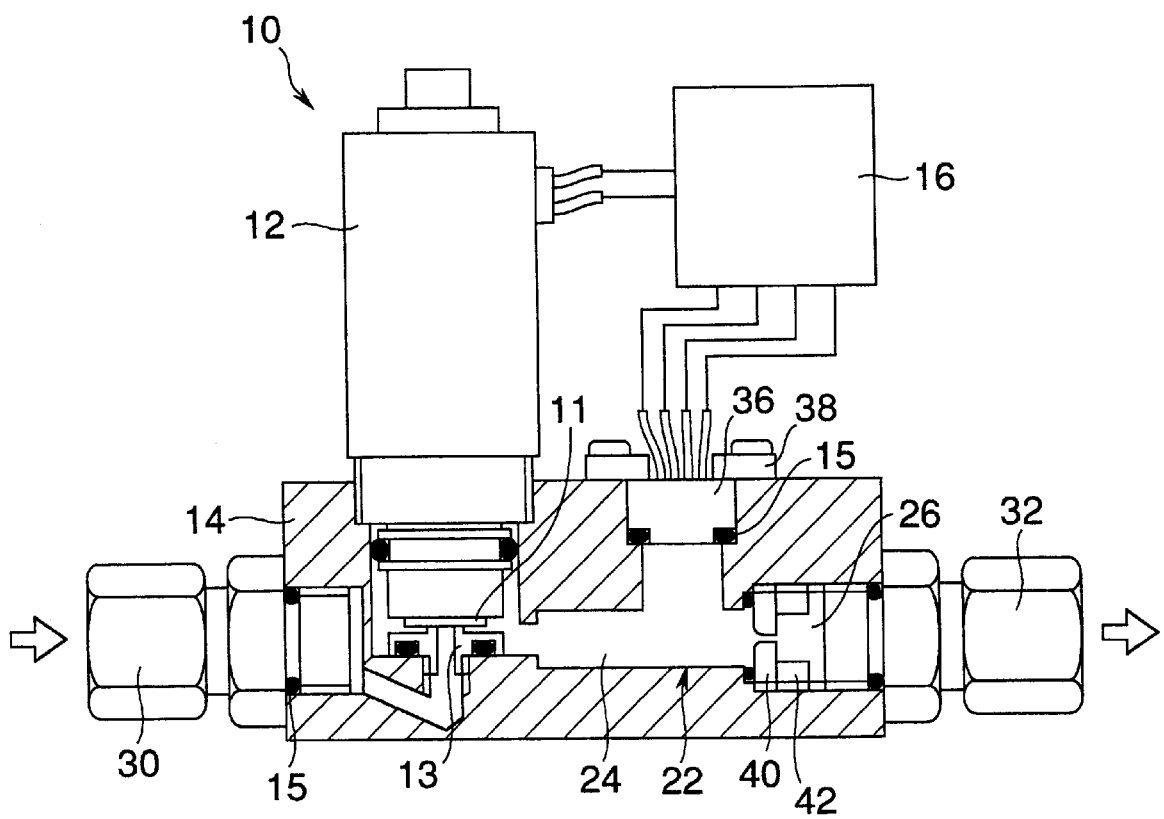
FIG. 1 is a front view, partly in cross-section, of a flow control valve of the first embodiment according to the present invention.

FIG. 1 is a front view, partly in cross-section, of a flow control valve 10 according to the present invention. The flow control valve 10 has an upstream side coupling 30 and a downstream side coupling 32 on the both ends thereof and a base 14 in which a fluid passage 22 is made.

A solenoid valve 12 of a valve member is fixed on the base 14 and the flow of gas is controlled by the solenoid valve 12.

A solenoid valve 12 is a well-known solenoid valve comprising a valve head 11 and a valve seat 13.

A sonic nozzle 40 is disposed in the fluid passage 22 and the fluid passage 22 comprises an upstream side passage 24 before the sonic nozzle 40 and a downstream side passage 26 after the sonic nozzle 40.

A pressure sensor 36 for measuring the upstream side pressure of the sonic nozzle 40 is disposed in the upstream side passage 24 via a sensor retainer 38.

The pressure sensor 36 can detect the pressure of gas usually in a response time of not more than 0.01 sec.

The pressure sensor 36 and the solenoid valve 12 are connected to a control circuit 16.

And, since the pressure sensor of this kind is well known to one skilled in the art, the description of the sensor will be omitted.

An O-ring 15 made of rubber is fitted in each connecting part and sliding part of the flow control valve 10 to prevent the leak of gas.

The gas whose flow is controlled by the solenoid valve 12 passes the upstream side passage 24 and the sonic nozzle 40 and the pressure of the gas in the upstream side passage 24 is usually detected by the pressure sensor 36. The detected pressure of the gas in the upstream side passage 24 is sent to the control circuit 16 as a form of an electric signal and is fed back to the action of the solenoid valve 12.

As described above, since the response time of the pressure sensor 36 is not more than 0.01 sec., the signal detected by the pressure sensor 36 is quickly fed back to the solenoid valve 12 via the control circuit 16 to improve the response of the solenoid valve 12.

Figure 2:
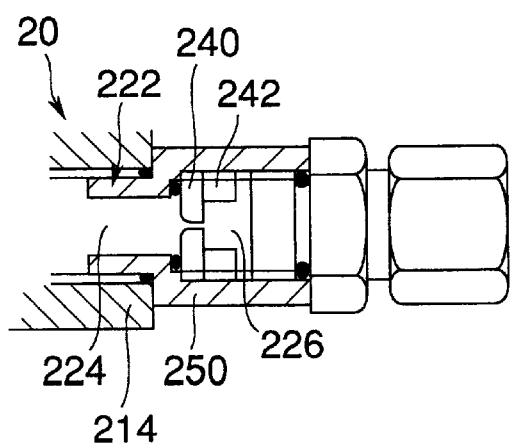
FIG. 2 is a cross-sectional view of the main part of the flow control valve of the second embodiment according to the present invention.

Next, FIG. 2 is a cross-sectional view of the main part of the second embodiment according to the present invention.

This flow control valve 20 has a constitution that a solenoid valve (not shown) is fixed on the base 214 having a fluid passage 222, as in the case of the flow control valve 10 shown in FIG. 1.

Only an upstream side passage 224 is formed in the fluid passage 222 made in the base 214 and a sonic nozzle 240 and a downstream side passage 226 are built in an adapter 250 and the adapter 250 is mounted on the outside of the base 214.

Since the other constitution is the same as the constitution shown in FIG. 1, the description thereof will be omitted.

Figure 3:
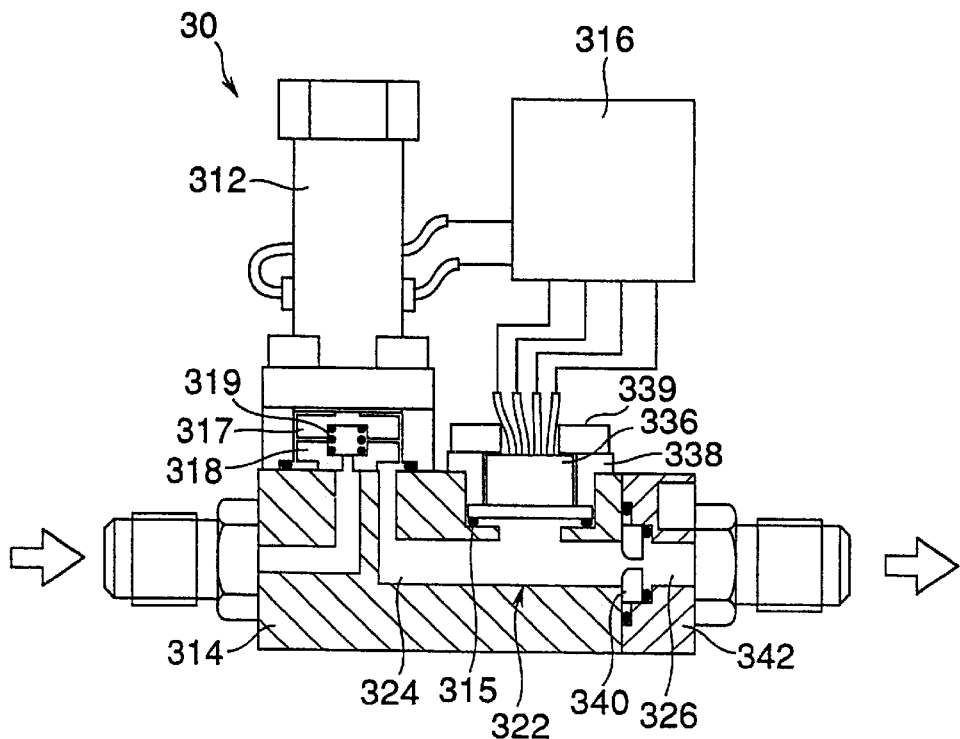
FIG. 3 is a front view, partly in cross-section, of the flow control valve of the third embodiment according to the present invention.

Next, FIG. 3 is a front view, partly in cross-section, of the third embodiment according to the present invention.

This solenoid valve 30 uses a piezo actuator 312 instead of the solenoid valve 12 of a valve member used in the flow control valve 10 shown in FIG. 1 and a sonic nozzle 340 is built in a flange 342.

The piezo actuator 312 used in the flow control valve 30 transmits the displacement due to a piezo stock (not shown) to a valve head 317 and a valve seat 318 via a diaphragm (not shown) and a spring 319.

Since the piezo actuator 312 is used in this embodiment instead of a solenoid valve, the more fine flow control of the gas can be performed.

Since the other constitution is the same as the constitution shown in FIG. 1, the description thereof will be omitted.

Each connecting part and sliding part of the flow control valve 30 are sealed by a metal seal 315 to prevent the leak of the gas.

In many cases of the flow control of the process gas in the semiconductor manufacturing process, 1) the downstream side pressure of the flow control valve is reduced (vacuum) and 2) the gas is supplied at a specified temperature by the surroundings of the device: therefore, the semiconductor manufacturing process is a suitable technical field of the flow control valve according to the present invention.

EFFECTS OF THE INVENTION

Since the flow control valve according to the present invention detects the pressure of the gas in the upstream side passage of the sonic nozzle by the sensor and feeds back the pressure of the gas back, it has a good response in the flow control.

Therefore, even if an abrupt change in the flow and the pressure of the gas happens, a stable flow control can be performed.

In addition, since the flow control valve is operated by detecting the pressure of the gas, it has an accessory effect that it can double as a function of the safety device of the circuit.

EXPLANATION OF THE REFERENCE NUMERALS 10, 20, 30: flow control valve
12: solenoid valve
16, 316: control circuit
14, 214, 314: base
22, 222, 324: fluid passage
24, 224, 324: upstream side passage
26, 226, 326: downstream side passage
36, 336: pressure sensor
40, 240, 340: sonic nozzle Although the invention has been described in its preferred embodiment with a certain degree of particularity, it is to be understood that numerous changes can be made without deviating from the invention as hereinafter claimed.

What is claimed:

1. A flow control valve comprising a closed fluid passage having an exit disposed in a base and a valve member fixed on the base, wherein a sonic nozzle is disposed at the exit side of the valve member within the closed fluid passage, and wherein a gas pressure in the upstream side of the sonic nozzle is detected by a pressure sensor between the valve member and the sonic nozzle and fed back to the valve member to control the flow rate through the sonic nozzle in the closed fluid passage.

2. A flow control valve as claimed in claim 1, wherein the valve member is a solenoid valve.

3. A flow control valve as claimed in claim 1, wherein the valve member is a piezo actuator.

4. A flow control valve as claimed in claim 1 wherein the pressure sensor includes a means to produce a stable flow rate control through the sonic nozzle in the closed fluid passage.

5. A flow control valve as claimed in claim 1 wherein the pressure sensor is also connected to a remote pressure monitor means for also monitoring the pressure upstream of the sonic nozzle in the closed fluid passage.

6. A flow control valve as claimed in claim 1 wherein the pressure sensor is the sole means to control the flow rate through the sonic nozzle in the closed fluid passage.

7. A flow control valve as claimed in claim 1 wherein the valve member, sonic nozzle, and pressure sensor are unitary with the base.

8. A flow control valve as claimed in claim 1 wherein there is an adaptor intermediate of the sonic nozzle and the base.

9. A flow control valve comprising a closed fluid passage having an inlet and an exit disposed in a base and a valve member fixed on the base, wherein a sonic nozzle is disposed at the exit side of the valve member within the closed fluid passage between the inlet and the exit, wherein a gas pressure on the upstream side of the sonic nozzle is detected by the pressure sensor between the valve member and the sonic nozzle and fed back to the valve member to control the flow rate through the sonic nozzle in the closed fluid passage, and the pressure sensor is the sole means to control the flow rate through the sonic nozzle in the closed fluid passage.

10. A flow control valve as claimed in claim 9 wherein the valve member is a solenoid valve.

11. A flow control valve as claimed in claim 9 wherein the valve member is a piezo actuator.

12. A flow control valve as claimed in claim 9 wherein the pressure sensor includes a means to produce a stable flow rate control through the closed fluid passage.

13. A flow control valve as claimed in claim 9 wherein the pressure sensor is also connected to a remote pressure monitor means for also monitoring the pressure in the closed fluid passage.

14. A flow control valve as claimed in claim 9 wherein the valve member, sonic nozzle, and pressure sensor are unitary with the base.

15. A flow control valve as claimed in claim 9 wherein there is an adaptor intermediate of the sonic nozzle and the base.

* * * * *